(12) United States Patent
Iwafuchi et al.

(10) Patent No.: US 10,602,026 B2
(45) Date of Patent: Mar. 24, 2020

(54) IMAGE PROCESSING APPARATUS, IMAGE PROCESSING METHOD, AND NON-TRANSITORY COMPUTER READABLE MEDIUM

(71) Applicant: FUJI XEROX CO., LTD., Tokyo (JP)

(72) Inventors: Toshihiro Iwafuchi, Kanagawa (JP); Noriko Sakai, Kanagawa (JP); Yusuke Izumisawa, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 101 days.

(21) Appl. No.: 15/888,267

(22) Filed: Feb. 5, 2018

(65) Prior Publication Data
US 2018/0367704 A1 Dec. 20, 2018

(30) Foreign Application Priority Data

Jun. 20, 2017 (JP) .................................. 2017-120823
Nov. 16, 2017 (JP) .................................. 2017-220878

(51) Int. Cl.
*H04N 1/60* (2006.01)
*G06T 7/90* (2017.01)
*H04N 1/62* (2006.01)
*G06T 11/00* (2006.01)

(52) U.S. Cl.
CPC ............. *H04N 1/6008* (2013.01); *G06T 7/90* (2017.01); *G06T 11/001* (2013.01); *H04N 1/622* (2013.01); *G06T 2200/24* (2013.01); *G06T 2207/10004* (2013.01); *G06T 2207/30124* (2013.01); *G06T 2210/16* (2013.01); *H04N 2201/0084* (2013.01); *H04N 2201/0089* (2013.01)

(58) Field of Classification Search
CPC ........ H04N 1/6008; H04N 1/622; G06T 7/90; G06T 11/001
See application file for complete search history.

(56) References Cited

U.S. PATENT DOCUMENTS

| | | | |
|---|---|---|---|
| 6,198,843 B1 * | 3/2001 | Nakauchi | G06T 11/001 358/518 |
| 8,649,056 B2 | 2/2014 | Kobayashi | |
| 2009/0315911 A1 * | 12/2009 | Ohnishi | G06T 11/001 345/593 |
| 2010/0092036 A1 * | 4/2010 | Das | G06K 9/3241 382/103 |
| 2016/0360071 A1 * | 12/2016 | Matsui | H04N 1/46 |

FOREIGN PATENT DOCUMENTS

| | | |
|---|---|---|
| JP | 2012-170018 A | 9/2012 |
| JP | 2015-204571 A | 11/2015 |

* cited by examiner

*Primary Examiner* — David F Dunphy
(74) *Attorney, Agent, or Firm* — Sughrue Mion, PLLC

(57) ABSTRACT

An image processing apparatus includes a specifying unit, an extraction unit, and a creation unit. The specifying unit specifies, for one image among a first image before color conversion and a second image after color conversion, an area for which image information is extracted. The extraction unit extracts plural pieces of color conversion information, which are image information about pixels in the area of the one image among the first image and the second image, the area being specified by the specifying unit, and image information about pixels in the other image corresponding to the pixels in the one image. The creation unit creates a color conversion property on the basis of the plural pieces of color conversion information extracted by the extraction unit.

14 Claims, 11 Drawing Sheets

FIRST COLOR DATA
RGBa1={0,0,255}
RGBa2={0,32,255}
RGBa3={0,64,255}
RGBa4={0,96,255}
RGBa5={0,128,255}

FIRST IMAGE
(IMAGE BEFORE COLOR ADJUSTMENT)

SECOND COLOR DATA
RGBb1={16,0,255}
RGBb2={16,32,255}
RGBb3={32,64,255}
RGBb4={32,96,255}
RGBb5={64,128,255}

SECOND IMAGE
(IMAGE AFTER COLOR ADJUSTMENT)

FIRST IMAGE
(IMAGE BEFORE COLOR ADJUSTMENT)

FIRST COLOR DATA $RGBa1=\{0,0,255\}$
$RGBa2=\{0,32,255\}$
$RGBa3=\{0,64,255\}$
$RGBa4=\{0,96,255\}$
$RGBa5=\{0,128,255\}$

SECOND IMAGE
(IMAGE AFTER COLOR ADJUSTMENT)

SECOND COLOR DATA $RGBb1=\{16,0,255\}$
$RGBb2=\{16,32,255\}$
$RGBb3=\{32,64,255\}$
$RGBb4=\{32,96,255\}$
$RGBb5=\{64,128,255\}$

FIG. 6

Create Profile

○ ○ ○

Profile name : [ aaaaaaaaaa ]

Saved in : [ aaaaa ] [ Refer to ... ]

Please select images before and after correction necessary for learning.

Before correction : [ xxxxxxxxx ]
The number of selected images : — [ Refer to ... ]

After correction : [ yyyyyyyyyyyyy ]
The number of selected images : 1000 [ Refer to ... ]

Profile creation condition: [Level of obtaining colors for learning] Automatic [ Detail settings ... ]

Result of diagnosis : ⚠ The number of images for learning is too small.
Please increase the number of images that are set.

Distribution of obtained color data : If you want to increase the number of colors for learning, please change the number of colors to be obtained by pressing Detail settings or increase the number of images that are set.

White : ▦ ☐
Black : ■ ☐
Gray : ▨ ☐
Beige : ▨ ☐
Red : ▨ ☐
Orange : ☐ ☐
Yellow : ☐ ☐
Green : ▦ ☐
Light blue : ▨ ☐
Blue : ▨ ☐
Purple : ▨ ☐
Pink : ▨ ☐

[ Create profile ]  [ Exit ]

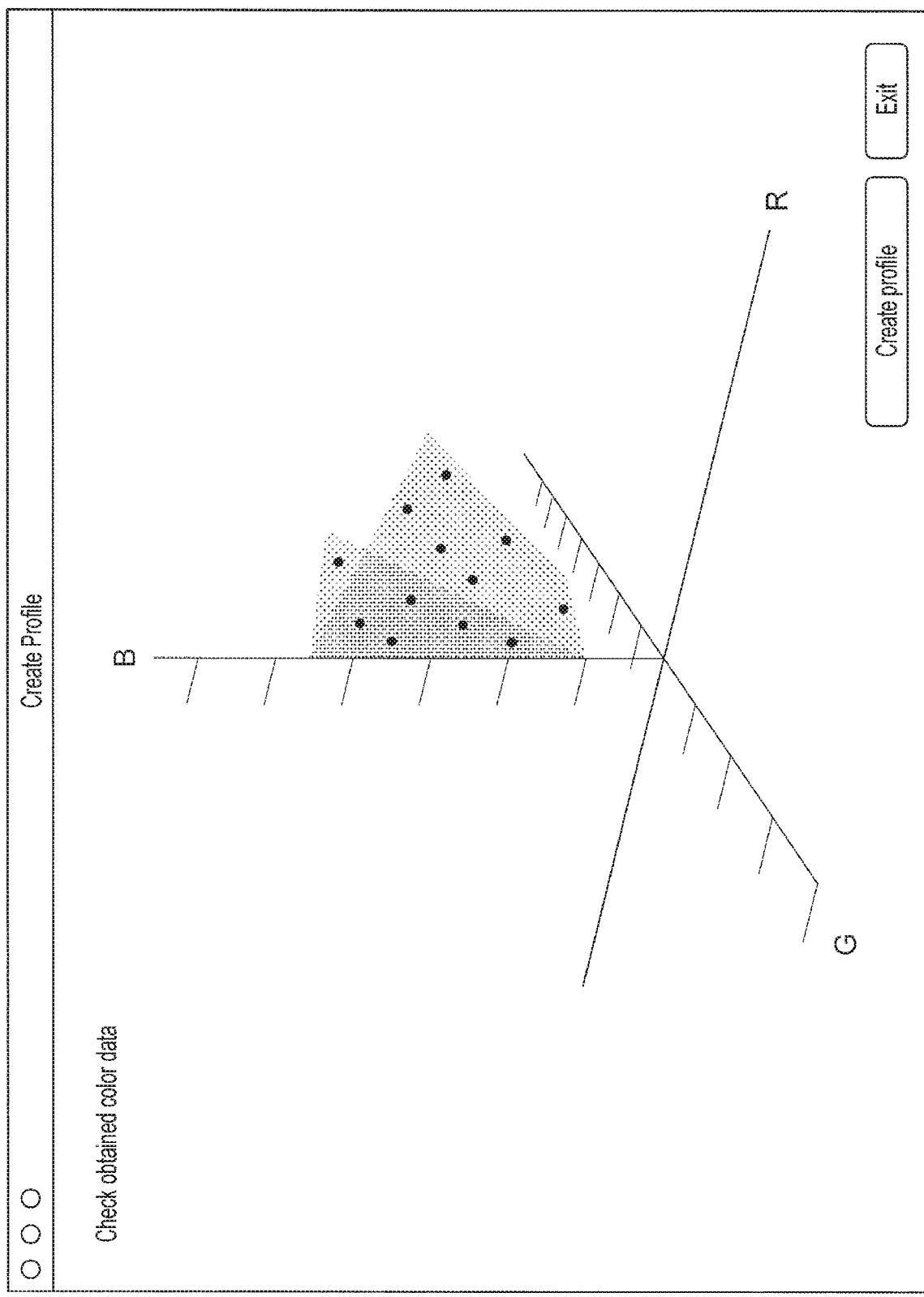

IMAGE PROCESSING APPARATUS, IMAGE PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-120823 filed Jun. 20, 2017 and Japanese Patent Application No. 2017-220878 filed Nov. 16, 2017.

BACKGROUND

(i) Technical Field

The present invention relates to an image processing apparatus, an image processing method, and a non-transitory computer readable medium.

(ii) Related Art

With the widespread use of digital cameras, smartphones, tablets, and so on, the number of users who capture and view digital images is currently increasing. Such images are captured in various environments that are affected by illumination light and so on. Further, images of various subjects are captured. Therefore, after image capturing, a captured image may be found to be an image not expected by the user, and the user often adjusts, for example, the color tone of the captured image.

SUMMARY

According to an aspect of the invention, there is provided an image processing apparatus including a specifying unit, an extraction unit, and a creation unit. The specifying unit specifies, for one image among a first image before color conversion and a second image after color conversion, an area for which image information is extracted. The extraction unit extracts plural pieces of color conversion information, which are image information about pixels in the area of the one image among the first image and the second image, the area being specified by the specifying unit, and image information about pixels in the other image corresponding to the pixels in the one image. The creation unit creates a color conversion property on the basis of the plural pieces of color conversion information extracted by the extraction unit.

BRIEF DESCRIPTION OF THE DRAWINGS

An exemplary embodiment of the present invention will be described in detail based on the following figures, wherein:

FIG. 6 illustrates a first example screen for checking color data extracted by a color data extraction unit;

FIG. 7 illustrates a second example screen for checking color data extracted by the color data extraction unit;

DETAILED DESCRIPTION

Hereinafter, an exemplary embodiment of the present invention will be described in detail with reference to the attached drawings.

Description of Image Processing System

Figure 1:
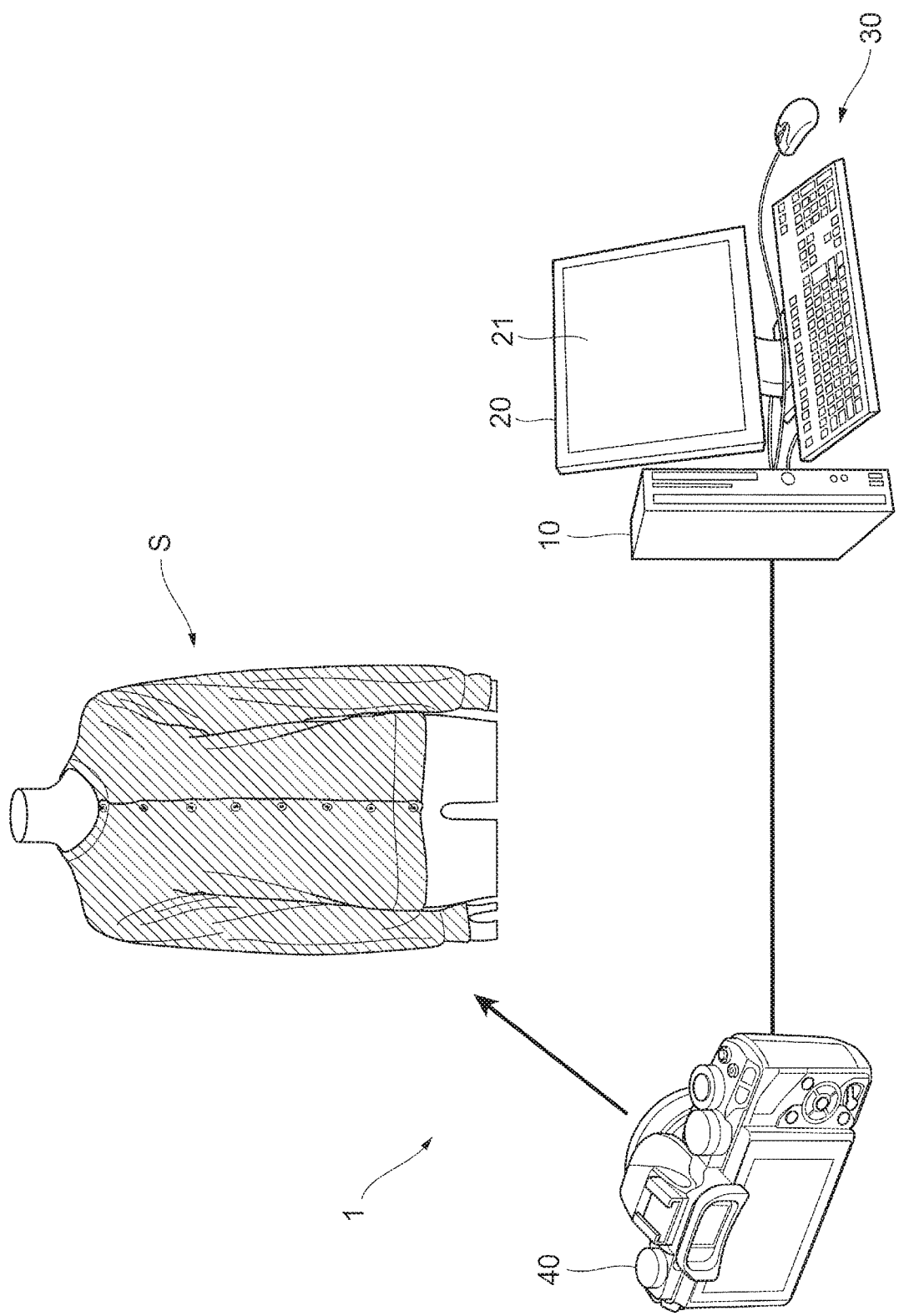
FIG. 1 is a diagram illustrating an example configuration of an image processing system according to an exemplary embodiment.

FIG. 1 is a diagram illustrating an example configuration of an image processing system 1 according to this exemplary embodiment.

As illustrated in FIG. 1, the image processing system 1 according to this exemplary embodiment includes an image processing apparatus 10, a display device 20, an input device 30, and a camera 40. The image processing apparatus 10 makes a color adjustment (color conversion) to an original image captured by using the camera 40. The display device 20 displays an image on the basis of image data output from the image processing apparatus 10. The input device 30 is used by a user to input various types of information to the image processing apparatus 10. The camera 40 is used to capture an image of an image-capture subject S and generates image data to which a color adjustment is made by the image processing apparatus 10.

The image processing apparatus 10 is, for example, a general-purpose personal computer (PC). The image processing apparatus 10 runs various types of application software under the control of an operating system (OS) to thereby make a color adjustment and so on.

The display device 20 displays images on a display screen 21. The display device 20 is constituted by, for example, a liquid crystal display for a PC, a liquid crystal display television, or a projector that has a function of displaying images by additive color mixture. Therefore, the display system of the display device 20 is not limited to a liquid crystal display system. In the example illustrated in FIG. 1, the display screen 21 is provided on the display device 20. In a case of using, for example, a projector as the display device 20, the display screen 21 is a screen or the like that is provided external to the display device 20.

The input device 30 is constituted by a keyboard, a mouse, and so on. The input device 30 is used to input instructions for activating and terminating application software for a color adjustment and instructions given by a user to the image processing apparatus 10 for making a color adjustment in a case of making a color adjustment, which will be described in detail below.

The camera 40 is an example of an image capturing apparatus and includes, for example, an optical system that converges incident light and an image sensor that is an image sensing unit detecting the light converged by the optical system.

The optical system is formed of a single lens or is formed by combining plural lenses. In the optical system, for example, lenses are combined and the surfaces of the lenses are coated to thereby remove various aberrations. The image sensor is formed by arranging image sensing devices, such as charge-coupled devices (CCDs) or complementary metal-oxide semiconductors (CMOSs).

The image processing apparatus 10 and the display device 20 are connected to each other via Digital Visual Interface (DVI) and may be connected to each other via, for example, High-Definition Multimedia Interface (HDMI) (registered trademark) or DisplayPort instead of DVI.

The image processing apparatus 10 and the input device 30 are connected to each other via Universal Serial Bus (USB) and may be connected to each other via, for example, IEEE 1394 or RS-232C instead of USB.

The image processing apparatus 10 and the camera 40 are connected to each other via a wireline in the example illustrated in FIG. 1 and are connected to each other via, for example, USB, IEEE 1394, or RS-232C. Accordingly, image data of an image captured by using the camera 40 is transmitted to the image processing apparatus 10 via the wireline. However, the connection is not limited to this, and a wireless connection, such as a wireless local area network (LAN) or Bluetooth (registered trademark), may be used. The image processing apparatus 10 and the camera 40 need not be connected to each other, and the camera 40 may pass image data to the image processing apparatus 10 via, for example, a memory card, such as an SD card.

In the image processing system 1 thus configured, first, a user captures an image of the image-capture subject S by using the camera 40. The image captured by using the camera 40 is an original image, which is a first image, and data of this image is transmitted to the image processing apparatus 10. On the display device 20, the original image, which is an image before color processing, is displayed. Next, when the user uses the input device 30 to input an instruction given to the image processing apparatus 10 for making a color adjustment, the image processing apparatus 10 makes a color adjustment to the original image. The result of this color adjustment is reflected to, for example, the image displayed on the display device 20, and an image after the color adjustment, which is a second image different from the first image, is drawn and displayed on the display device 20. In this case, the user is able to make a color adjustment interactively while viewing the image displayed on the display device 20, and therefore, is able to perform a color adjustment operation more intuitively and more easily.

The second image need not be the image after a color adjustment made by the image processing apparatus 10 and may be an image captured by using another camera having properties, that is, image-capture conditions, different from those of the camera 40. In this case, an image captured by using the camera 40 is regarded as the first image, and an image captured by using a camera having different image-capture conditions is regarded as the second image.

On the basis of the result of the color adjustment, the image processing apparatus 10 creates a conversion relationship that is used to make a color adjustment to an original image and to obtain an image after the color adjustment. When it is assumed that, for example, first and second color data is RGB data composed of red (R), green (G), and blue (B) data, and that the first color data is represented by $(R_a, G_a, B_a)$ and the second color data is represented by $(R_b, G_b, B_b)$, the color adjustment is a process of $(R_a, G_a, B_a) \rightarrow (R_b, G_b, B_b)$. This conversion relationship is used to reproduce a color adjustment similar to the color adjustment previously made. The conversion relationship is also called a profile and is created as a 3D LUT. However, the conversion relationship is not limited to this. For example, the conversion relationship may be created as a one-dimensional (1D) LUT representing $R_a \rightarrow R_b$, $G_a \rightarrow G_b$, and $B_a \rightarrow B_b$. The conversion relationship may be created as a multidimensional matrix representing $(R_a, G_a, B_a) \rightarrow (R_b, G_b, B_b)$. The process for creating the conversion relationship will be described below.

The image processing system 1 according to this exemplary embodiment is not limited to the form illustrated in FIG. 1. The image processing system 1 may be, for example, a tablet terminal. In this case, the tablet terminal includes a touch panel, and the touch panel displays images and is used to input user instructions by, for example, touching. That is, the touch panel functions as the display device 20 and the input device 30. As the camera 40, a camera built in the tablet terminal may be used. As an apparatus into which the display device 20 and the input device 30 are integrated, a touch monitor may be used. The touch monitor includes a touch panel that is used as the display screen 21 of the display device 20. In this case, an image is displayed on the touch monitor on the basis of image data output from the image processing apparatus 10. The user inputs an instruction for making a color adjustment by, for example, touching the touch monitor.

In order for the image processing apparatus 10 to create a conversion relationship, the image processing apparatus 10 needs to obtain first color data from an original image, which is an image before a color adjustment (color conversion), and to obtain second color data from an image after a color adjustment (color conversion), as described above.

At this time, if the number of portions in an image from which color data is obtained is too small, and the number of obtained pieces of color data is too small accordingly, color data for a necessary tone value may be omitted, and the accuracy of the conversion relationship may decrease. If the number of portions in an image from which color data is obtained is too large, and the number of obtained pieces of color data is too large accordingly, for example, color data may be obtained from a portion that is not necessary for color conversion. As a consequence, noise may be included in a color conversion model described below. That is, color data for which the direction for retouching differs may be included. As a result, a highly accurate color conversion model is unlikely to be created, and the accuracy of the conversion relationship may decrease.

Accordingly, in this exemplary embodiment, the image processing apparatus 10 is configured as follows so that, when the image processing apparatus 10 creates a conversion relationship, the above-described issue is unlikely to arise.

Description of Image Processing Apparatus

Now, the image processing apparatus 10 is described.

Figure 2:
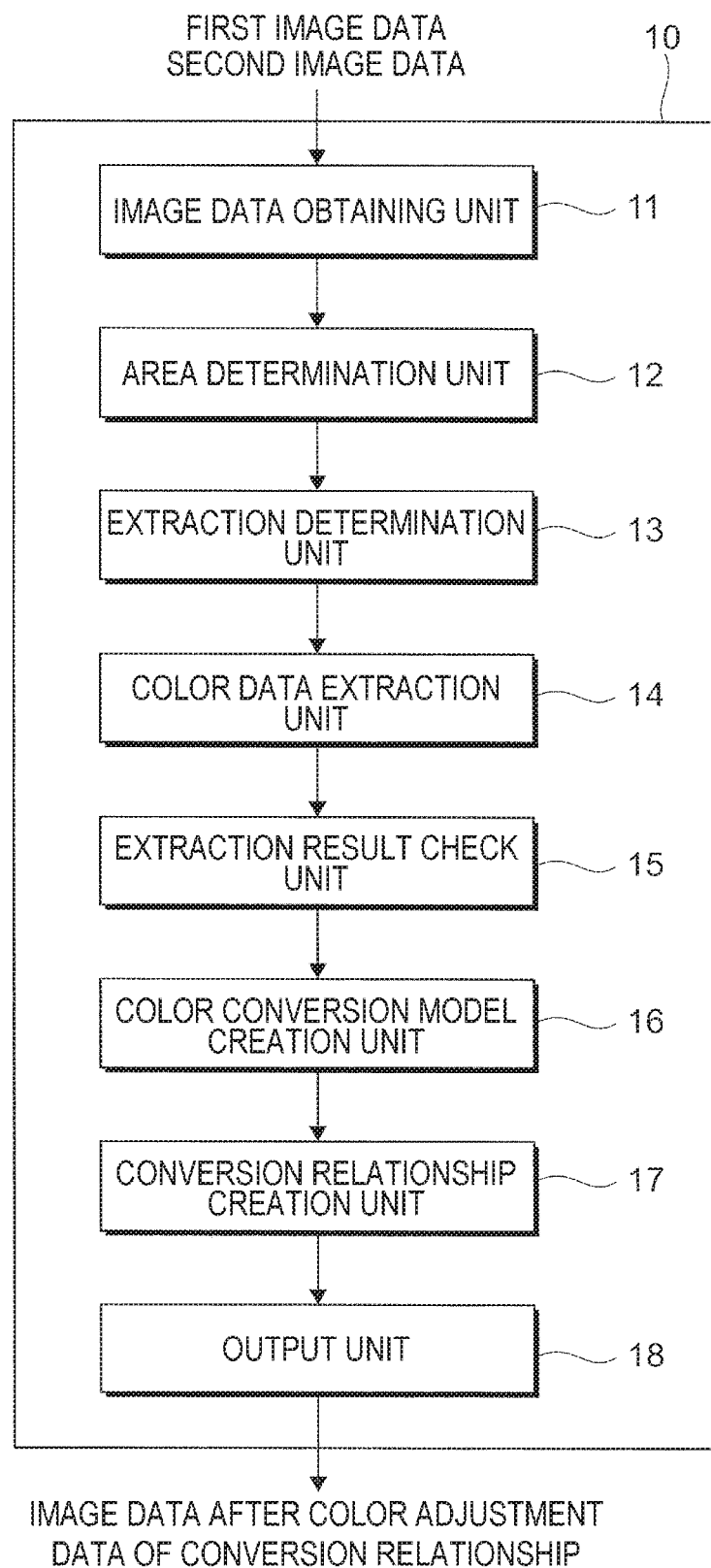
FIG. 2 is a block diagram illustrating an example functional configuration of an image processing apparatus according to an exemplary embodiment.

FIG. 2 is a block diagram illustrating an example functional configuration of the image processing apparatus 10 according to this exemplary embodiment. FIG. 2 illustrates functions related to this exemplary embodiment selected from among various functions provided by the image processing apparatus 10.

As illustrated in FIG. 2, the image processing apparatus 10 according to this exemplary embodiment includes an image data obtaining unit 11, an area determination unit 12, an extraction determination unit 13, a color data extraction unit 14, an extraction result check unit 15, a color conversion model creation unit 16, a conversion relationship creation unit 17, and an output unit 18. The image data obtaining unit 11 obtains image data. The area determination unit 12 determines an area for which color data is extracted from image data. The extraction determination unit 13 determines a method for extracting color data. The color data extraction unit 14 extracts color data from image data. The extraction result check unit 15 instructs a user to check the result of extraction of color data. The color conversion model creation unit 16 creates a color conversion model. The conversion relationship creation unit 17 creates a conversion relationship.

The image data obtaining unit 11 obtains first image data, which is image data of an original image before a color adjustment (color conversion), and second image data, which is image data after a color adjustment (color conversion). The first and second image data is in a data format for display on the display device 20 and is, for example, RGB data described above. The image data obtaining unit 11 may obtain image data in another data format and covert the image data to obtain RGB data.

Figure 3:
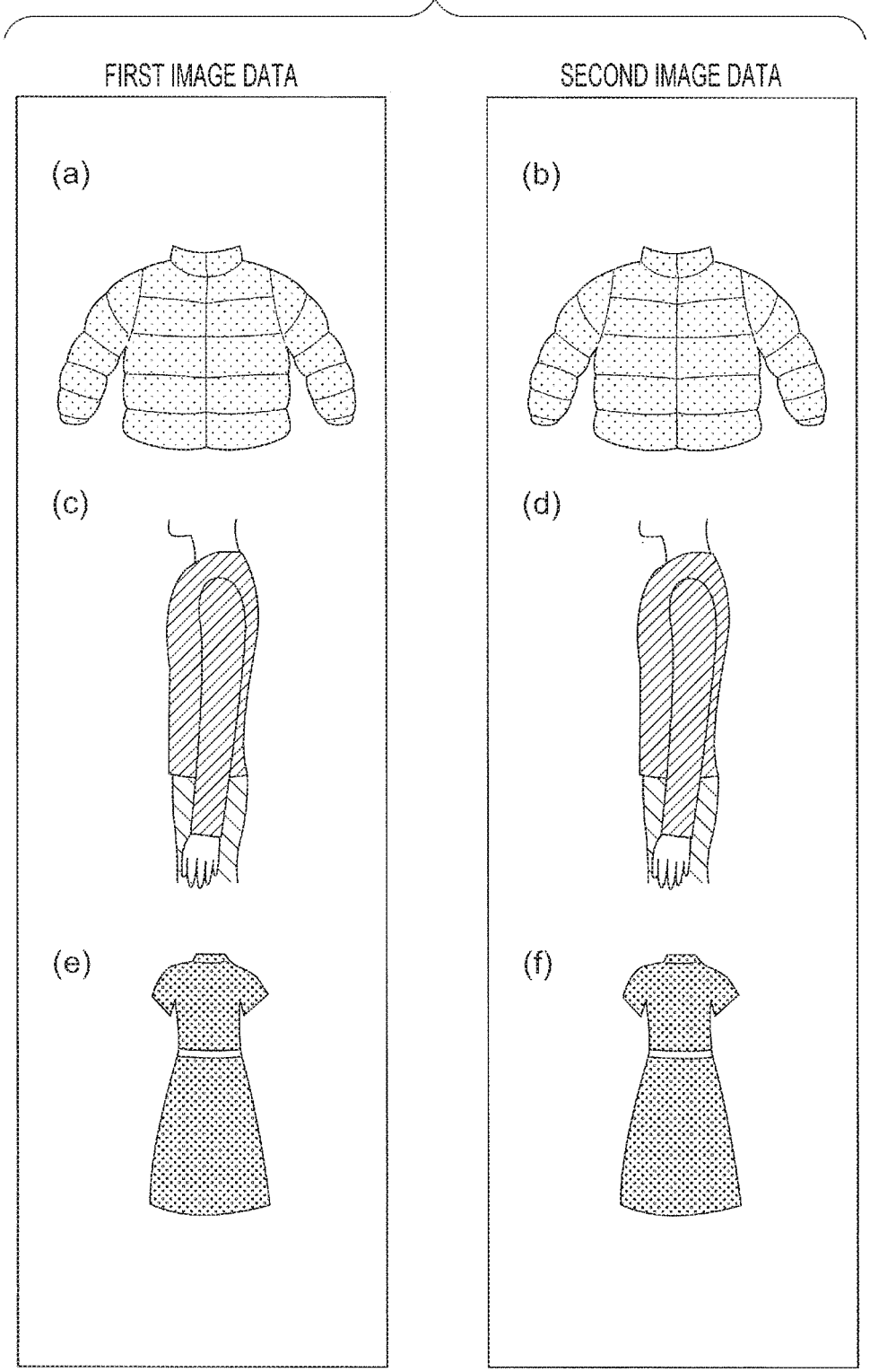
FIG. 3 is a diagram illustrating examples of image data obtained by an image data obtaining unit.

FIG. 3 is a diagram illustrating examples of image data obtained by the image data obtaining unit 11.

FIG. 3 illustrates a case where three sets of image data obtained by capturing images of clothes that are items for sale and a person putting on clothes that are items for sale are provided. In FIG. 3, (a) and (b) respectively illustrate first image data (image data before a color adjustment) and second image data (image data after a color adjustment) when an image of a down jacket is captured. In FIG. 3, (c) and (d) respectively illustrate first image data and second image data when an image of a person putting on a shirt and pants is captured. In FIG. 3, (e) and (f) respectively illustrate first image data and second image data when an image of a dress is captured.

As described above, plural sets of first image data and second image data are provided to thereby obtain image data that includes a larger number of colors.

The area determination unit 12 is an example of a specifying unit and specifies, for one of an original image before a color adjustment (before color conversion) and an image after a color adjustment (after color conversion), an area for which color data (image information) is extracted.

That is, the area determination unit 12 determines positions at which color data is obtained from the image data illustrated in FIG. 3. A color adjustment is made to a portion corresponding to clothes that are items for sale. That is, it is requested that the color of an item for sale is reproduced more precisely so that the color of the actual item for sale matches the color of the item for sale displayed as an image. Therefore, an item for sale is likely to be a target of a color adjustment. On the other hand, such a request is unlikely to be made to the area of the background of an item for sale, and the background is unlikely to be a target of a color adjustment. Therefore, the area determination unit 12 determines the portion corresponding to clothes to be an area for which color data is extracted.

Specifically, the area determination unit 12 determines a portion other than the background to be an area for which color data is extracted. Accordingly, the area determination unit 12 needs to determine the background and a portion other than the background. Image data of the background is substantially the same as image data of a left end portion of the image. Therefore, a portion in which image data significantly differs from the image data of a left end portion of the image is determined to be a portion other than the background. In order to sample image data that is compared with the image data of a left end portion of the image, for example, pixel positions are selected at predetermined intervals in the image, and image data of a pixel at each pixel position is compared with image data of a pixel in a left end portion of the image. Alternatively, a mask having a predetermined size may be applied to the image data, and the average value of image data within the mask may be compared with the value of a pixel in a left end portion of the image.

As another method for determining the area, the area determination unit 12 performs a frequency analysis on the basis of the image data and obtains a pixel position at which a high frequency is produced. This pixel position corresponds to the outline of a portion other than the background, and therefore, the area determination unit 12 determines the portion inside the outline to be a portion other than the background. Further, as another method for determining the area, the area determination unit 12 defines in advance an area centered on the center of the image and having a predetermined size and determines a portion within the area to be a portion other than the background.

It is preferable the area determination unit 12 determine an area for which color data is extracted by further excluding a portion having a skin color of a person. That is, it is desirable not to make a color adjustment to a skin color of a person. A color adjustment to a skin color of a person may result in an unnatural color. Therefore, it is desirable not to include a portion having a skin color of a person as an area for which color data is extracted.

The area determination unit 12 determines an area for which color data is extracted for each set of first image data and second image data obtained by the image data obtaining unit 11. In the examples illustrated in FIG. 3, the area determination unit 12 determines, for each of the three sets of first image data and second image data, an area for which color data is extracted by using the first image data and the second image data. However, the area determination unit 12 need not use all sets of first image data and second image data and may use some of the sets of first image data and second image data. In a case of using some of the sets of first image data and second image data, the area determination unit 12 selects sets at random, for example. In a case where a large number of pieces of image data are obtained, the area determination unit 12 may perform a process for selecting pieces of image data as described above.

The extraction determination unit 13 is an example of a determination unit and determines intervals at which color data is extracted in an area specified by the area determination unit 12. Therefore, as color data is extracted at shorter intervals, the space between positions at which color data is extracted in the area decreases, and the number of pieces of color data that are extracted increases. On the other hand, as color data is extracted at longer intervals, the space between positions at which color data is extracted in the area increases, and the number of pieces of color data that are extracted decreases. If the intervals at which color data is extracted remain unchanged, the number of pieces of color data that are extracted decreases as the number of pixels in the area decreases, and the number of pieces of color data that are extracted increases as the number of pixels in the area increases.

Specifically, the extraction determination unit 13 determines intervals at which color data is extracted on the basis of at least one of the number of colors, the number of tones, and a pattern included in the area.

Figure 4A:
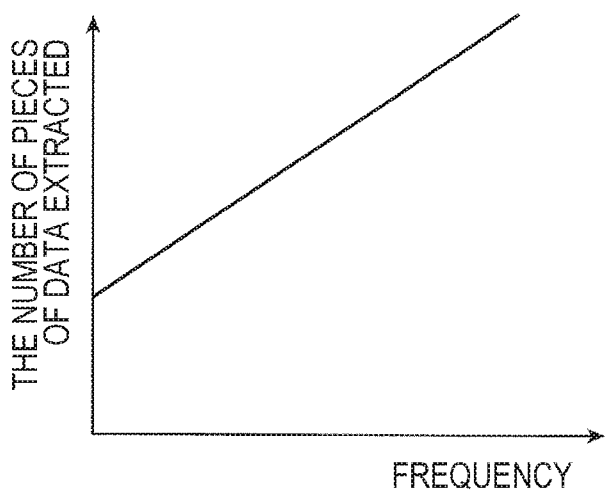
FIG. 4A illustrates a case of determining, on the basis of a pattern included in an area, position intervals at which color data is extracted.

FIG. 4A illustrates a case of determining, on the basis of a pattern included in the area, intervals at which color data is extracted.

Here, the extraction determination unit 13 determines a pattern by performing a frequency analysis. In FIG. 4A, the horizontal axis represents the frequency in the area, and the vertical axis represents the number of pieces of data from which color data is extracted.

In this case, as the frequency decreases, intervals at which color data is extracted are made longer, and as the frequency increases, intervals at which color data is extracted are made shorter. That is, in a case where a pattern of, for example, clothes is not fine, intervals at which color data is extracted are made longer to decrease the number of pieces of color data that are extracted. On the other hand, in a case where a pattern of, for example, clothes is fine, intervals at which color data is extracted are made shorter to increase the number of pieces of color data that are extracted.

Figure 4B:
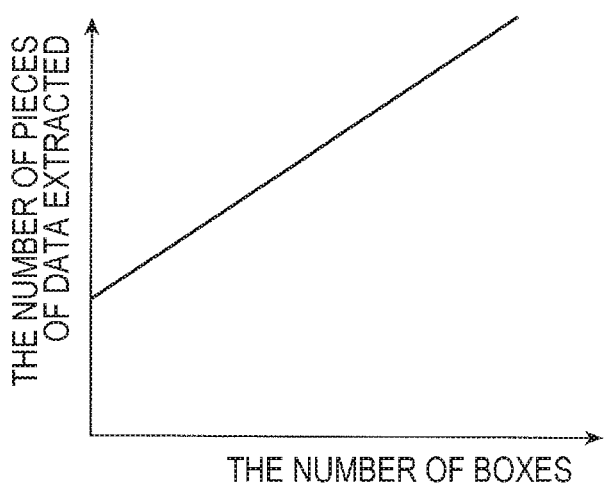
FIG. 4B illustrates a case of determining, on the basis of the number of colors and/or the number of tones, position intervals at which color data is extracted.

FIG. 4B illustrates a case of determining, on the basis of the number of colors and/or the number of tones, intervals at which color data is extracted.

Here, the extraction determination unit 13 assumes that color areas (boxes) are obtained by dividing a color space with a predetermined method and determines intervals at which color data is extracted on the basis of the number of color areas (the number of boxes) that include a color included in the area determined by the area determination unit 12. As the number of colors and/or the number of tones included in the area determined by the area determination unit 12 increase, the number of boxes that include a color included in the area increases, and as the number of colors and/or the number of tones included in the area determined by the area determination unit 12 decrease, the number of boxes that include a color included in the area decreases. In FIG. 4B, the horizontal axis represents the number of boxes that include a color included in the area determined by the area determination unit 12, and the vertical axis represents the number of pieces of data from which color data is extracted.

As illustrated in FIG. 4B, as the number of boxes that include a color included in the area decreases, intervals at which color data is extracted are made longer to thereby decrease the number of pieces of color data that are extracted, and as the number of boxes that include a color included in the area increases, intervals at which color data is extracted are made shorter to thereby increase the number of pieces of color data that are extracted. That is, in a case where the number of colors and/or the number of tones included in the area are small, intervals at which color data is extracted is made longer to thereby decrease the number of pieces of color data that are extracted. On the other hand, in a case where the number of colors and/or the number of tones included in the area are large, intervals at which color data is extracted is made shorter to thereby increase the number of pieces of color data that are extracted.

The extraction determination unit 13 may determine intervals at which color data is extracted further on the basis of the number of colors included in the boxes that include a color included in the area.

Figure 4C:
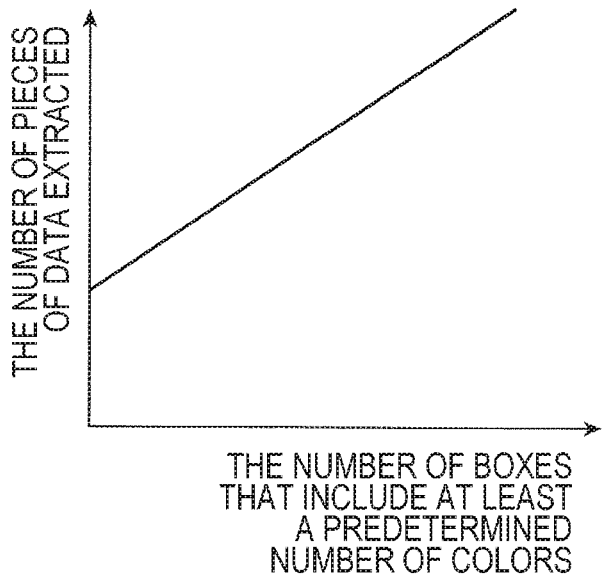
FIG. 4C illustrates a case of determining, on the basis of the number of colors included in boxes as well as the number of colors and/or the number of tones, position intervals at which color data is extracted.

FIG. 4C illustrates a case of determining, on the basis of the number of colors included in the boxes that include a color included in the area as well as the number of colors and/or the number of tones, intervals at which color data is extracted. In FIG. 4C, the horizontal axis represents the number of boxes that include at least a predetermined number of colors among the boxes that include a color included in the area, and the vertical axis represents the number of pieces of data from which color data is extracted.

As illustrated in FIG. 4C, as the number of boxes for which the number of included colors is equal to or larger than a threshold decreases, intervals at which color data is extracted is made longer to thereby decrease the number of pieces of color data that are extracted, and as the number of boxes for which the number of included colors is equal to or larger than the threshold increases, intervals at which color data is extracted is made shorter to thereby increase the number of pieces of color data that are extracted. In this case, a box that includes only a small number of colors is not counted. Also in this case, as the number of colors and/or the number of tones included in the area decrease, intervals at which color data is extracted is made longer to thereby decrease the number of pieces of color data that are extracted. On the other hand, as the number of colors and/or the number of tones included in the area increase, intervals at which color data is extracted is made shorter to thereby increase the number of pieces of color data that are extracted.

The method for determining intervals at which color data is extracted is not limited to the above-described method.

For example, the extraction determination unit 13 may determine intervals at which color data is extracted on the basis of the number of patterned images included in the area for which color data is extracted. In this case, as the number of patterned images included in the area decreases, intervals at which color data is extracted is made longer, and as the number of patterned images included in the area increases, intervals at which color data is extracted is made shorter.

The extraction determination unit 13 may determine a weight that is added to extracted color data in addition to intervals at which color data is extracted or instead of intervals at which color data is extracted. That is, both intervals at which color data is extracted and a weight that is added to extracted color data may be used. Alternatively, intervals at which color data is extracted are made constant, and a weight that is added to extracted color data may be used.

The color data extraction unit 14 extracts, as color conversion information, color data from pixels in an area of one image among the original image (first image) and the image after a color adjustment (second image), the area being determined by the area determination unit 12, and from pixels in the other image corresponding to the pixels in the one image at intervals for extracting color data determined by the extraction determination unit 13. In other words, the color data extraction unit 14 extracts, as a set of pieces of color data at corresponding positions in the images, first color data from the first image data and second color data from the second image data. In this case, the set of the extracted first color data and the extracted second color data is color conversion information.

That is, the color data extraction unit 14 extracts, from the first image data and the second image data, first color data and second color data at the same positions in the images.

Figure 5A:
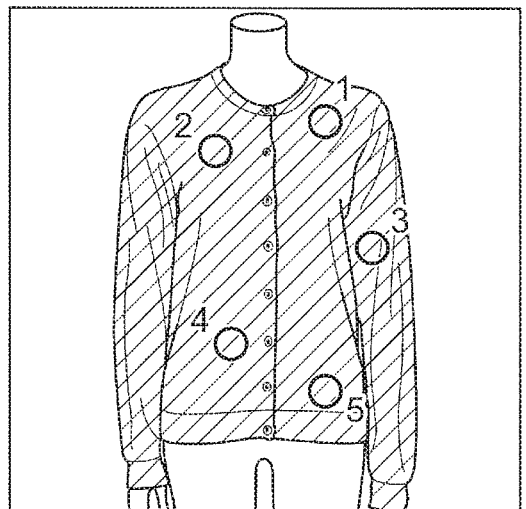
FIGS. 5A and 5B are diagrams illustrating example pairs of first color data and second color data.
Figure 5B:
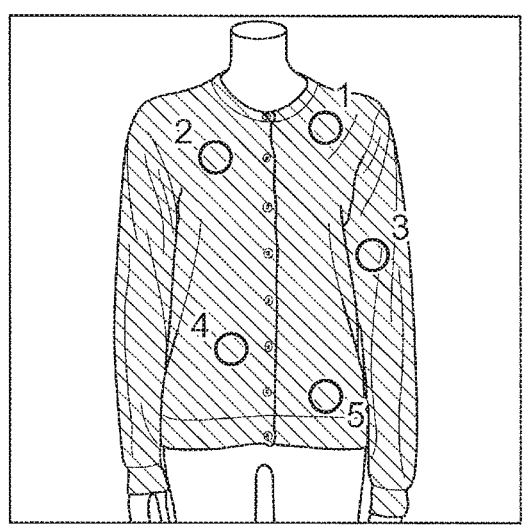

FIGS. 5A and 5B are diagrams illustrating example pairs of first color data and second color data.

FIG. 5A illustrates an example original image that is an image before a color adjustment and example pieces of first color data. In FIG. 5A, the original image is an image of a blouse, from which pieces of color data are extracted at portions indicated by 1 to 5 and are respectively indicated as RGBa1 to RGBa5. In this case, the blouse is entirely blue, and therefore, all of the pieces of color data RGBa1 to RGBa5 are pieces of RGB data indicating blue.

FIG. 5B illustrates an example image after a color adjustment and example pieces of second color data. In FIG. 5B, pieces of color data respectively extracted from the same portions indicated by 1 to 5 as in FIG. 5A are indicated as RGBb1 to RGBb5.

The extraction result check unit 15 is an example of an extraction result check unit and outputs color data (color conversion information) extracted by the color data extraction unit 14 for display on the display device 20.

FIG. 6 illustrates a first example screen for checking color data extracted by the color data extraction unit 14.

FIG. 6 illustrates a case where the distribution of the color data extracted by the color data extraction unit 14 is displayed as "distribution of obtained color data", and the number of pieces of color data that have been extracted is indicated on a scale of 1 to 4 for each of the twelve colors, namely, white through pink. This example illustrates a case where a necessary number of pieces of color data have been obtained for, for example, white, black, gray, blue, purple, and pink, but a necessary number of pieces of color data have not been obtained for the other colors, particularly, yellow, green, and light blue. Accordingly, a notification "The number of images for learning is too small. Please increase the number of images that are set." is sent to the user as a result of diagnosis. That is, the number of sets of first color data and second color data obtained by the image data obtaining unit 11 is insufficient, and the number of pieces of color data extracted by the color data extraction unit 14 is not sufficient accordingly. The extraction result check unit 15 is able to determine whether the number of pieces of color data that have been extracted is sufficient or not.

FIG. 7 illustrates a second example screen for checking color data extracted by the color data extraction unit 14.

FIG. 7 illustrates a case where the distribution of the color data extracted by the color data extraction unit 14 is plotted in an RGB color space and displayed on the display device 20 as a color space image. In FIG. 7, the black dots represent pieces of color data extracted by the color data extraction unit 14.

Accordingly, the user is able to visually know the distribution of the extracted pieces of color data. At this time, the extraction result check unit 15 is able to delete some of the extracted pieces of first color data and second color data (color conversion information) in accordance with an instruction from the user. This operation is performed by, for example, the user deleting a piece of color data determined not to be necessary among the pieces of color data illustrated in FIG. 7.

The color conversion model creation unit 16 is an example of a creation unit and creates a color conversion property (color conversion model) on the basis of plural sets of first color data and second color data (color conversion information) extracted by the color data extraction unit 14. That is, the color conversion model creation unit 16 creates a color conversion model that represents the relationship between the first color data and the second color data extracted by the color data extraction unit 14.

Figure 8:
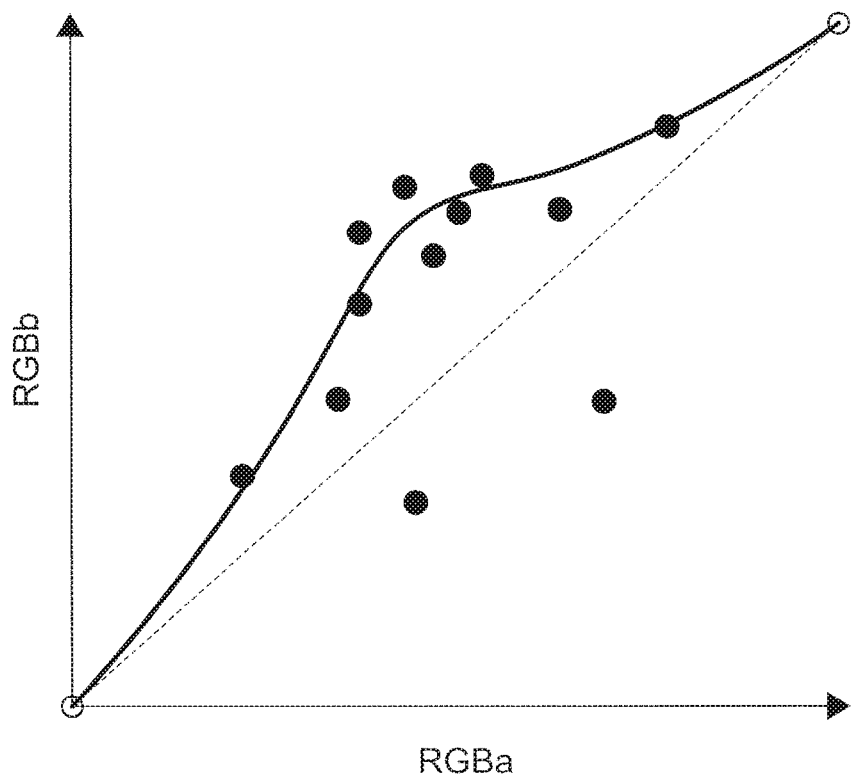
FIG. 8 is a diagram illustrating an example color conversion model.

FIG. 8 is a diagram illustrating an example color conversion model.

In FIG. 8, the horizontal axis represents first color data, which is color data before a color adjustment, and the vertical axis represents second color data, which is color data after a color adjustment. The first and second color data is RGB data. In FIG. 8, the first color data is indicated as RGBa, and the second color data is indicated as RGBb.

The black dots represent the result of plotting the pieces of first color data and the pieces of second color data extracted by the color data extraction unit 14. FIG. 8 illustrates a case where twelve pairs of first color data and second color data have been extracted by the color data extraction unit 14.

The solid line represents the relationship between the first color data and the second color data and represents the color conversion model created by the color conversion model creation unit 16. That is, the color conversion model may be regarded as a function that represents the relationship between the first color data and the second color data. When this function is expressed by f, the color conversion model is expressed by RGBb=f(RGBa). The color conversion model may be created by using a publicly known method. However, it is preferable that a method having high fitting performance for nonlinear characteristics, namely, a weighted regression model or a neural network, be used. Note that nonlinear characteristics need not be used, and linear characteristics using a matrix model may be used.

It is preferable that the color conversion model creation unit 16 create a color conversion model so that the relationship between the first color data and the second color data is a nonlinear monotone increasing function.

Figure 9A:
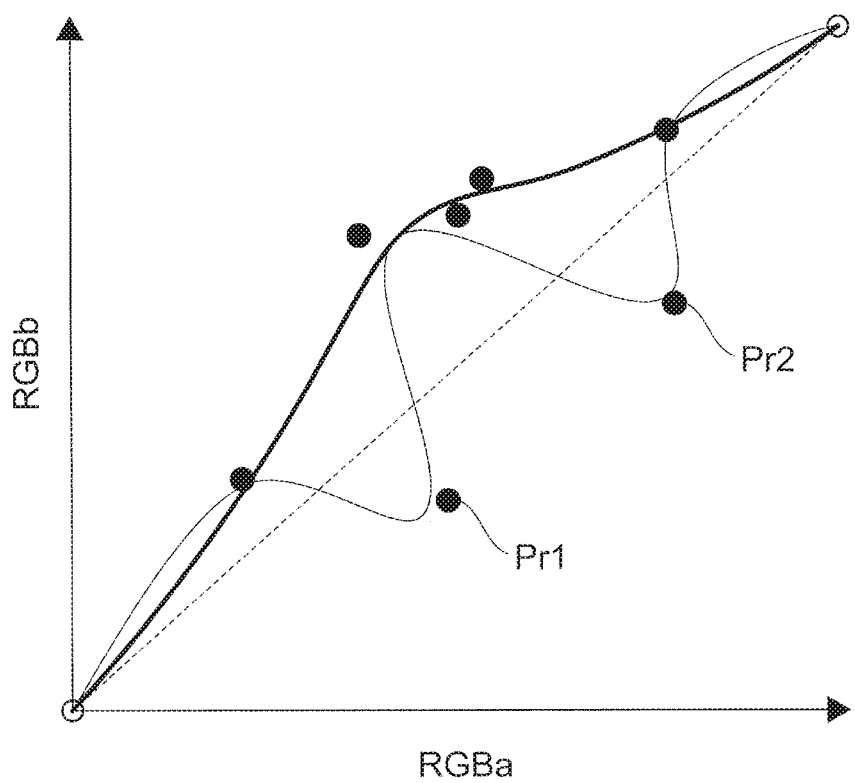
FIGS. 9A and 9B are diagrams for comparing a case of creating a color conversion model so that the relationship between first color data and second color data is a monotone increasing function with a case of creating a color conversion model so that the relationship is not a monotone increasing function.
Figure 9B:
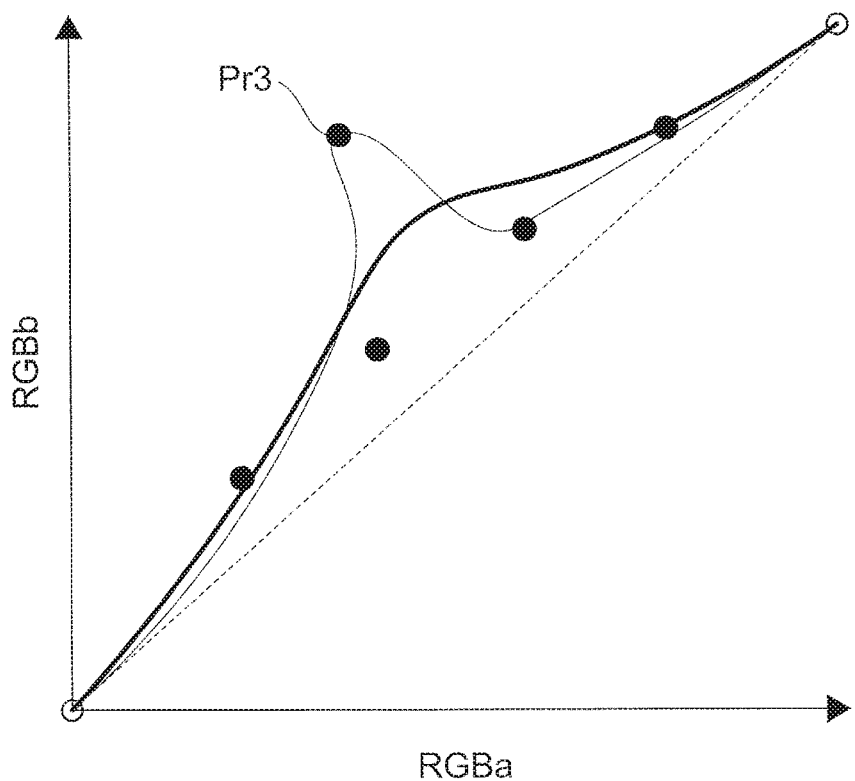

FIGS. 9A and 9B are diagrams for comparing a case of creating a color conversion model so that the relationship between first color data and second color data is a monotone increasing function with a case of creating a color conversion model so that the relationship is not a monotone increasing function.

In each of FIGS. 9A and 9B, the curves represented by solid lines represent color conversion models. Among the color conversion models, a color conversion model represented by a thick line is created so that the relationship between the first color data and the second color data is a monotone increasing function, and is a color conversion model similar to that in FIG. 8. Among the color conversion models, a color conversion model represented by a thin line is created so that the relationship between the first color data and the second color data is not a monotone increasing function. The monotone increasing function described here is a function with which the slope of the tangent line touching the solid line that represents the color conversion model is equal to or larger than 0° at any point, and the slope may be equal to 0° at some points. That is, the monotone increasing function described here is a monotone increasing function in a broad sense.

In the color conversion model represented by a thick line, the slope of the tangent line is not smaller than 0° (not negative) at any point and is equal to or larger than 0° at all points.

On the other hand, in the color conversion model represented by a thin line, the slope of the tangent line is smaller than 0° (negative) at some points. That is, as RGBa increases, RGBb decreases in some portions. When such a color conversion model is used to create a conversion relationship, and the conversion relationship thus created is used to make a color adjustment, an image after the color adjustment may include a tone jump. When a color conversion model is created so that the relationship between the first color data and the second color data is a monotone increasing function, the possibility of a tone jump is reduced, and furthermore, variations in a color adjustment are reduced.

In order for the color conversion model creation unit 16 to create a color conversion model as represented by a thick line, it is preferable that the number of pairs of first color data and second color data like the pairs indicated by Pr1, Pr2, and Pr3 be smaller. The pairs of first color data and second color data indicated by Pr1, Pr2, and Pr3 are color data for which the direction for retouching differs, as described above. In this exemplary embodiment, the image data obtaining unit 11 obtains pieces of first image data, which are image data before a color adjustment, and pieces of second image data, which are image data after a color adjustment, and from these pieces of image data, pieces of color data for various colors are obtained as sets of first color data and second color data to thereby reduce the possibility of color data for which the direction for retouching differs being included. The extraction determination unit 13 determines intervals at which color data is extracted, and the color data extraction unit 14 extracts an appropriate number of pieces of color data to thereby further reduce the possibility of color data for which the direction for retouching differs being included. As described with reference to FIG. 7, the user may perform an operation for deleting a piece of color data determined not to be necessary to thereby further reduce the possibility of color data for which the direction for retouching differs being included.

In a case where a weight is set for a pair of first color data and second color data, the color conversion model creation unit 16 creates a color conversion model by using the weight.

The conversion relationship creation unit 17 creates a conversion relationship that is used to reproduce a color adjustment made to the first image (original image) on the basis of the color conversion model created by the color conversion model creation unit 16. The color conversion model is created from sets of first color data and second color data (color conversion information), and therefore, in other words, the conversion relationship creation unit 17 creates a conversion relationship that is used to reproduce a color adjustment on the basis of the sets of first color data and second color data. The conversion relationship is used to reproduce the result of a color adjustment made to an original image by the user. That is, when a color adjustment is made to an image (original image) before a color adjustment by using the conversion relationship, a color adjustment similar to a color adjustment previously made by the user is made again to obtain an image after the color adjustment.

In a case where the conversion relationship is created as a 3D LUT, a representative pixel value is selected for each of R, G, and B. For example, in a case where data of each of R, G, and B is represented by an 8-bit tone value, the pixel value is an integer ranging from 0 to 255. Here, the pixel value is divided into, for example, eight values. Then, RGB data represented by each of the pixel values obtained by the division into eight values is assumed to be a lattice point (nine lattice points). In this case, the number of lattice points is $9^3=729$. For each of these lattice points, the relationship between the first color data and the second color data is calculated on the basis of the color conversion model. The relationship thus calculated is represented by an LUT, which is a 3D LUT. Accordingly, the 3D LUT is described as a relationship expressed by input value ($R_a$, $G_a$, $B_a$)–output value ($R_b$, $G_b$, $B_b$) for each lattice point.

It is preferable that the conversion relationship creation unit 17 create a conversion relationship that enables a color adjustment to a color included in the area determined by the area determination unit 12 and that does not enable a color adjustment to the other colors. For example, in the case of the images illustrated in FIGS. 5A and 5B, the conversion relationship creation unit 17 creates a conversion relationship that enables a color adjustment to the blue color area and that does not enable a color adjustment to the other colors. In the case where the conversion relationship is represented by a 3D LUT, the input value ($R_a$, $G_a$, $B_a$) and the output value ($R_b$, $G_b$, $B_b$) of a lattice point that corresponds to a color close to a color included in the area determined by the area determination unit 12 are different values, and the input value ($R_a$, $G_a$, $B_a$) and the output value ($R_b$, $G_b$, $B_b$) of any other lattice point are the same values in the 3D LUT. Therefore, in a case where the area determination unit 12 determines an area for which color data is extracted while further excluding a portion having a skin color of a person, a color adjustment is not made to a skin color of a person.

The output unit 18 is an example of a color adjustment unit that uses the conversion relationship to make a color adjustment to an image captured by using the camera 40, and outputs image data after the color adjustment and data of the conversion relationship. The image data after the color adjustment is output to the display device 20, and the display device 20 displays an image after the color adjustment on the basis of the image data. The data of the conversion relationship is stored on, for example, the image processing apparatus 10, and the conversion relationship is used to make a color adjustment. The conversion relationship may be output to an external device other than the image processing apparatus 10, and the external device may use the conversion relationship to make a color adjustment.

Now, an operation of the image processing apparatus 10 is described.

Figure 10:
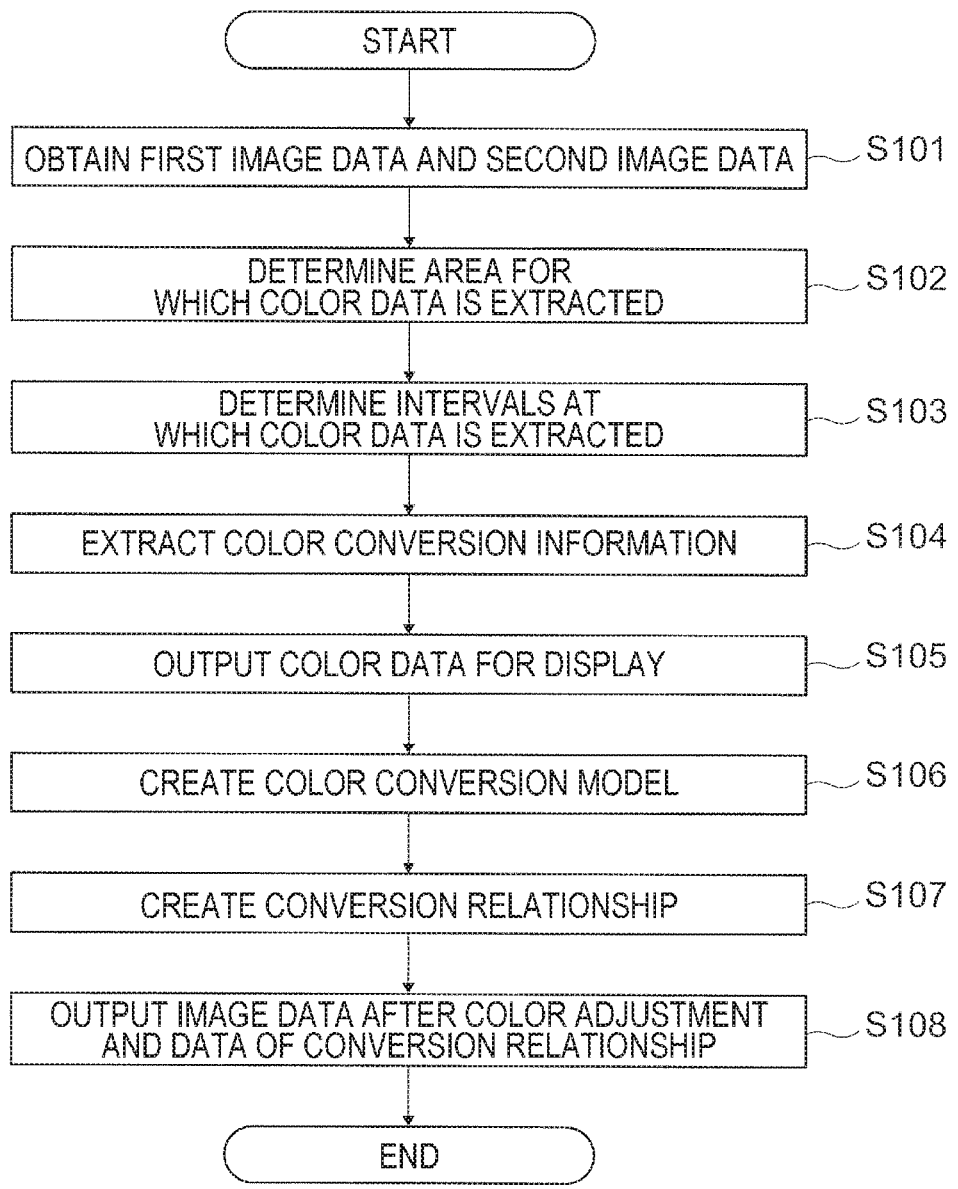
FIG. 10 is a flowchart for describing an operation of the image processing apparatus.

FIG. 10 is a flowchart for describing an operation of the image processing apparatus 10. The operation of the image processing apparatus 10 described below may be regarded as an image processing method that is used by the image processing apparatus 10.

The image data obtaining unit 11 obtains first image data, which is image data of an original image before a color adjustment, and second image data, which is image data after a color adjustment (step S101: image data obtaining step).

Next, the area determination unit 12 specifies, for one of the original image before a color adjustment and the image after a color adjustment, an area for which color data is extracted (step S102: specifying step). At this time, the area determination unit 12 determines a portion other than the background to be an area for which color data is extracted. It is preferable that the area determination unit 12 determine an area for which color data is extracted while further excluding a portion having a skin color of a person.

Subsequently, the extraction determination unit 13 determines intervals at which color data is extracted in the area specified by the area determination unit 12 (step S103: determination step). At this time, the extraction determination unit 13 determines intervals at which color data is extracted on the basis of at least one of the number of colors, the number of tones, and a pattern included in the area.

Subsequently, the color data extraction unit 14 extracts, as color conversion information, color data from pixels in the area of one image among the original image and the image after a color adjustment, the area being specified by the area determination unit 12, and from pixels in the other image corresponding to the pixels in the one image at the intervals for extracting color data determined by the extraction determination unit 13 (step S104: extraction step).

Subsequently, the extraction result check unit 15 outputs the color data extracted by the color data extraction unit 14 for display on the display device 20 (step S105, extraction result checking step).

At this time, the user may be allowed to perform an operation for deleting color data that is determined not to be necessary, as described with reference to FIG. 7.

Subsequently, the color conversion model creation unit 16 creates a color conversion model on the basis of plural sets of first color data and second color data (color conversion information) extracted by the color data extraction unit 14 (step S106: creation step).

The conversion relationship creation unit 17 creates a conversion relationship that is used to reproduce the color adjustment on the basis of the color conversion model created by the color conversion model creation unit 16 (step S107: conversion relationship creation step). The conversion relationship is created as, for example, a 3D LUT as described above. The conversion relationship may be output in a widely known format, such as the International Color Consortium (ICC) profile format.

Thereafter, the output unit 18 outputs image data after a color adjustment and data of the conversion relationship (step S108).

In this exemplary embodiment, a color conversion model is created while excluding color data for which the direction for retouching differs to thereby create a more ideal color conversion model, and furthermore, create a highly accurate conversion relationship. When such a color conversion model is used to create output data (for example, an ICC profile), and the output data is used to perform color conversion on an image captured by using the camera 40, a more ideal color adjustment is made.

In the above-described example, the original image is an image captured by using the camera 40; however, the original image is not specifically limited. For example, the original image may be an image read by a scanner. Alternatively, commercially available image data or image data distributed via, for example, the Internet may be used as is as the original image.

Example Hardware Configuration of Image Processing Apparatus

Now, a hardware configuration of the image processing apparatus 10 is described.

Figure 11:
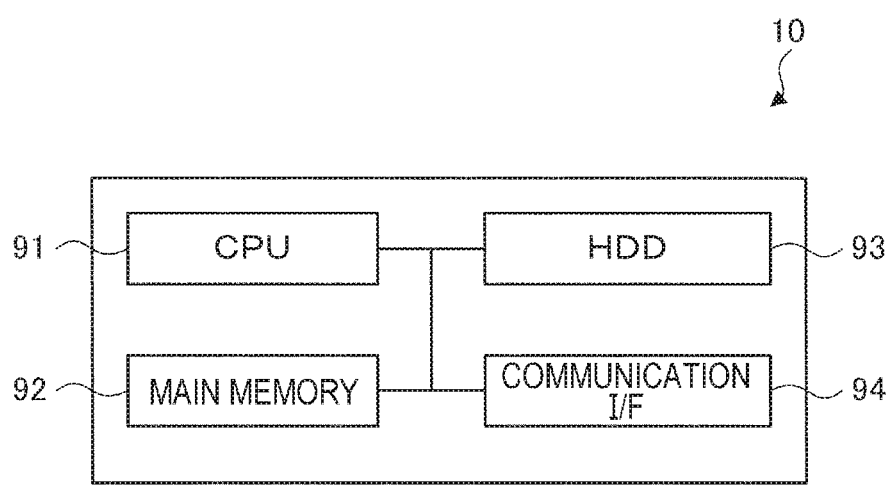
FIG. 11 is a diagram illustrating a hardware configuration of the image processing apparatus.

FIG. 11 is a diagram illustrating a hardware configuration of the image processing apparatus 10.

The image processing apparatus 10 is implemented as, for example, a PC as described above. As illustrated in FIG. 11, the image processing apparatus 10 includes a central processing unit (CPU) 91, which is an arithmetic processing unit, a main memory 92, which is a memory, and a hard disk drive (HDD) 93. The CPU 91 executes various programs, such as an operating system (OS) and application software. The main memory 92 is a storage area for storing various programs, data used when the programs are executed, and so on. The HDD 93 is a storage area for storing input data to various programs, output data from various programs, and so on.

The image processing apparatus 10 further includes a communication interface (I/F) 94 for external communication.

Description of Program

The processing performed by the image processing apparatus 10 in the exemplary embodiment described above is provided as, for example a program, such as application software.

Therefore, the processing performed by the image processing apparatus 10 in the exemplary embodiment may be regarded as a program for causing a computer to implement a specifying function of specifying, for one image among a first image and a second image, an area for which color data is extracted; an extraction function of extracting plural pieces of color conversion information, which are color data of pixels in the area of the one image among the first image and the second image, the area being specified by the specifying function, and color data of pixels in the other image corresponding to the pixels in the one image; and a creation function of creating a color conversion model on the basis of the plural pieces of color conversion information extracted by the extraction function.

The program for implementing the exemplary embodiment may be provided via a communication system, as a matter of course, or may be stored in a recording medium, such as a compact disc read-only memory (CD-ROM), and provided.

The exemplary embodiment has been described; however, the technical scope of the present invention is not limited to the scope of the above-described exemplary embodiment. It is obvious from the description of the claims that various modifications and alterations made to the above-described exemplary embodiment are included in the technical scope of the present invention.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a memory; and
   a processor configured to execute:
     a specifying unit configured to specify, for one image among a first image before color conversion and a second image after color conversion, an area for which image information is extracted;
     an extraction unit configured to extract a plurality of pieces of color conversion information, which are image information about pixels in the area of the one image among the first image and the second image, the area being specified by the specifying unit, and image information about pixels in the other image corresponding to the pixels in the one image; and
     a creation unit configured to create a color conversion property on the basis of the plurality of pieces of color conversion information extracted by the extraction unit, wherein
   the specifying unit is configured to specify a portion other than a background as the area for which image information is extracted.

2. The image processing apparatus according to claim 1, wherein
the specifying unit is configured to specify the area for which image information is extracted while further excluding a portion having a skin color of a person.

3. The image processing apparatus according to claim 1, wherein the first image and the second image are received from a user.

4. The image processing apparatus according to claim 1, wherein the processor is further configured to execute:
an extraction result check unit configured to determine whether a number of the plurality of pieces of color conversion information extracted by the extraction unit is sufficient for creating the color conversion property.

5. An image processing apparatus comprising:
a memory; and
a processor configured to execute:
a specifying unit configured to specify, for one image among a first image before color conversion and a second image after color conversion, an area for which image information is extracted;
an extraction unit configured to extract a plurality of pieces of color conversion information, which are image information about pixels in the area of the one image among the first image and the second image, the area being specified by the specifying unit, and image information about pixels in the other image corresponding to the pixels in the one image;
a creation unit configured to create a color conversion property on the basis of the plurality of pieces of color conversion information extracted by the extraction unit; and
a determination unit configured to determine intervals at which the image information is extracted in the area specified by the specifying unit, wherein
the extraction unit is configured to decide to extract the plurality of pieces of color conversion information at the intervals for extracting the image information determined by the determination unit.

6. The image processing apparatus according to claim 5, wherein
the determination unit is configured to determine the intervals at which the image information is extracted on the basis of at least one of the number of colors, the number of tones, and a pattern included in the area.

7. The image processing apparatus according to claim 6, wherein
the determination unit is configured to determine the pattern by performing a frequency analysis.

8. The image processing apparatus according to claim 6, wherein
the determination unit is configured to assume that color areas are obtained by dividing a color space with a predetermined method, and determine the intervals at which the image information is extracted on the basis of the number of the color areas that include a color included in the area.

9. The image processing apparatus according to claim 8, wherein
the determination unit is configured to determine the intervals at which the image information is extracted further on the basis of the number of colors included in the color areas that include a color included in the area.

10. The image processing apparatus according to claim 5, wherein
the determination unit is configured to determine a weight added to the plurality of extracted pieces of color conversion information in addition to the intervals at which the image information is extracted or instead of the intervals at which the image information is extracted.

11. An image processing apparatus comprising:
a memory; and
a processor configured to execute:
a specifying unit configured to specify, for one image among a first image before color conversion and a second image after color conversion, an area for which image information is extracted;
an extraction unit configured to extract a plurality of pieces of color conversion information, which are image information about pixels in the area of the one image among the first image and the second image, the area being specified by the specifying unit, and image information about pixels in the other image corresponding to the pixels in the one image;
a creation unit configured to create a color conversion property on the basis of the plurality of pieces of color conversion information extracted by the extraction unit; and
an extraction result check unit configured to output the plurality of pieces of color conversion information extracted by the extraction unit for display on a display device.

12. The image processing apparatus according to claim 11, wherein
the extraction result check unit is configured to delete one or more of the plurality of extracted pieces of color conversion information in accordance with a user instruction.

13. An image processing method comprising:
specifying, for one image among a first image before color conversion and a second image after color conversion, an area for which image information is extracted;
extracting a plurality of pieces of color conversion information, which are image information about pixels in the area of the one image among the first image and the second image, the area being specified in the specifying, and image information about pixels in the other image corresponding to the pixels in the one image; and
creating a color conversion property on the basis of the plurality of pieces of color conversion information extracted in the extracting, wherein
the area for which image information is extracted includes a portion of the one image other than a background of the one image.

14. A non-transitory computer readable medium storing a program causing a computer to execute a process for image processing, the process comprising:
specifying, for one image among a first image before color conversion and a second image after color conversion, an area for which image information is extracted;
extracting a plurality of pieces of color conversion information, which are image information about pixels in the area of the one image among the first image and the second image, the area being specified in the specifying, and image information about pixels in the other image corresponding to the pixels in the one image; and
creating a color conversion property on the basis of the plurality of pieces of color conversion information extracted in the extracting, wherein the area for which image information is extracted includes a portion of the one image other than a background of the one image.

\* \* \* \* \*